(12) United States Patent
Durif et al.

(10) Patent No.: US 6,716,380 B2
(45) Date of Patent: Apr. 6, 2004

(54) PROCESS AND DEVICE FOR CROSS-LINKING/EXPANDING A BLANK FOR A SAFETY SUPPORT FOR A TIRE AND SUPPORT OBTAINED BY THIS PROCESS

(75) Inventors: Pierre Durif, Enval (FR); Noel Morel, Enval (FR); Georges Peyron, Riom (FR); Gilbert Menard, Volvic (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 148 days.

(21) Appl. No.: 09/860,075

(22) Filed: May 17, 2001

(65) Prior Publication Data

US 2002/0026973 A1 Mar. 7, 2002

(30) Foreign Application Priority Data

May 19, 2000 (FR) .............................. 00 06488

(51) Int. Cl.⁷ .............................................. B29C 44/02
(52) U.S. Cl. ............................ 264/51; 152/158; 264/54
(58) Field of Search ...................... 264/51, 54; 152/158

(56) References Cited

U.S. PATENT DOCUMENTS

| | | | | |
|---|---|---|---|---|
| 3,812,225 A | * | 5/1974 | Hosoda et al. ................. | 264/54 |
| 3,872,201 A | | 3/1975 | Paul et al. | |
| 5,417,898 A | | 5/1995 | Volpi et al. .................... | 264/26 |
| 5,614,225 A | | 3/1997 | Volpi et al. | |
| 5,776,991 A | * | 7/1998 | Teratani ........................ | 521/99 |
| 6,209,601 B1 | * | 4/2001 | Mark ........................... | 152/158 |

FOREIGN PATENT DOCUMENTS

| | | |
|---|---|---|
| DE | 19640039 | 4/1998 |
| FR | 2095535 | 2/1972 |
| GB | 1189505 | 4/1970 |

OTHER PUBLICATIONS

Brünauer S, Emmet PH, Teller E. Adsorption of Gases in Multimolecular Layers. J. Amer. Chem. Soc. 1938;60:309–319.

* cited by examiner

*Primary Examiner*—Allan R. Kuhns
(74) *Attorney, Agent, or Firm*—Baker Botts L.L.P.

(57) ABSTRACT

A process for cross-linking/expanding at least one cross-linkable, expandable blank, which is intended to form all or part of an elastomeric safety support for a tire in which: the cross-linking consists of curing the expandable or expanded blank in a bath of fluid at excess pressure which is contained in an enclosure, such that the blank interacts with the bath independently of the enclosure, the temperature of the bath having a maximum value of between 110° C. and 210° C. and the absolute pressure of said bath having at least a value equal to or greater than 14 bar, and the expansion consists of curing the cross-linkable or cross-linked blank in the bath, the temperature of the bath having a maximum value of between 110° C. and 210° C., and the absolute pressure of the bath having at least a value equal to or greater than 5 bar and a final pressure-relief value substantially equal to 1 bar, for expanding the blank such that its increase in volume is unlimited with respect to the enclosure.

8 Claims, 4 Drawing Sheets

PROCESS AND DEVICE FOR CROSS-LINKING/EXPANDING A BLANK FOR A SAFETY SUPPORT FOR A TIRE AND SUPPORT OBTAINED BY THIS PROCESS

BACKGROUND OF INVENTION

The present invention relates to a process for expanding at least one cross-linkable or cross-linked blank which is intended to constitute, in the cross-linked, expanded state, all or part of an elastomeric safety support of cellular structure having closed cells, said support being intended to be mounted on a wheel rim within a tire. The invention also relates to a process for cross-linking and expanding said or each blank, a device for implementing said expansion or cross-linking/expansion process, and finally a section of cross-linked, expanded support and such a support which are obtained by this process.

The safety supports according to the invention can be used for equipping tires, for example, of machinery or vehicles of the two-wheeler, automobile or heavy-vehicle type.

The use of elastomeric safety supports having closed cells is well-known for competition tires which are intended to travel on bumpy courses of the "cross-country rally" type.

These cellular supports, which are usually of substantially toric form, are supposed to permit travel following a significant drop in pressure over a distance which depends in particular on the more or less severe conditions characterizing this travel, for example, following perforation of the tire.

Such supports are generally obtained by extruding a cross-linkable, expandable rubber composition which has been subjected to thermomechanical working in order to obtain a blank, then by cross-linking and expanding the blank, the origin of the expansion being the thermal decomposition of a blowing agent which is initially present in the rubber composition.

More precisely, in a first step of thermomechanical working, the rubber composition, which comprises in particular a diene elastomer such as butyl rubber (copolymer of isoprene and isobutylene), a reinforcing filler such as carbon black, a blowing agent to permit later obtaining of the expanded cellular structure, and a cross-linking system, is kneaded.

In a third step, which is carried out in an oven, the blank thus obtained is preheated, to a temperature usually of between 70° C. and 100° C.

In a fourth step, performed in a mold, at least partial cross-linking of the preheated blank is effected, at a temperature usually of between 130° and 150° C.

In a fifth step, which is performed in an oven, the demolded blank is subjected to expansion, at atmospheric pressure and at a temperature usually of between 130° C. and 150° C.

Thus a cross-linked, expanded support is obtained.

French patent specification FR-A-2 095 535 describes a process for foaming and hardening an elastomeric filler material, such as polyisoprene, dimethyl-methylvinyl polysiloxane or polybutadiene, within a mounted assembly formed of a previously-vulcanised tire which is mounted on a wheel rim. This filler material is intended to equip tires intended for vehicles of the heavy-vehicle type, and the main object desired is to minimize the surface oxidation within the body of the vulcanised tire.

This object is achieved in that document by implementing a process consisting of heating in an oven the mounted assembly by means of saturated steam at a temperature of approximately 149° C., then either removing the mounted assembly from the oven or carrying out therein a plurality of heating cycles followed by removal of the steam within the oven, in order to permit blowing of the filler material.

It will be noted that this mounted assembly is intended to form an enclosure of the mold type for the filler material which it contains, owing to the fact that the foam being blown presses on the wall of this mounted assembly.

It will also be noted that the foam which presses against the wall of the mounted assembly is the seat of local chemical reactions at the location of this wall (rim or tire), which induces heterogeneity of structure of the foam which is finally formed.

The conventional cross-linking/expansion processes which use a mold for cross-linking have one major drawback, which is linked to the density characteristics of the cross-linked, expanded supports which are obtained. In fact, the cross-linked, expanded supports which are obtained by these processes using a mold are generally characterized by an intermediate layer having a significantly higher density (usually in a ratio of 1.5) than that of the core or center of the support. There is shown diagrammatically in FIG. 5 appended to the present description a view in cross-section through such a support having, radially towards the inside of its outer surface (at the location of which there is a surface layer or skin A of the support), this intermediate layer B and said core C.

Now, experience shows that this density gradient is at the origin of increased propagation towards the core of the support of the deformations which are imposed on the latter when travelling at zero pressure, which results in likewise increased internal heating of the support, which may cause the destruction thereof within a relatively short period of travel.

SUMMARY OF THE INVENTION

The object of the present invention is to propose a process for expanding at least one partially cross-linked blank which is intended to form, in the cross-linked, expanded state, all or part of an elastomeric safety support of cellular structure having closed cells, said or each support being intended to be mounted on a wheel rim within a tire, which makes it possible to overcome the aforementioned disadvantage in relation to the use of a mold for the cross-linking.

To this end, an expansion process according to the invention is such that it consists of curing said or each blank in a bath of fluid at excess pressure which is contained in an enclosure, the temperature of said bath having a maximum value of between 110° C. and 210° C., and the absolute pressure of said bath having at least a value equal to or greater than 5 bar and a final pressure-relief value substantially equal to 1 bar, for expanding said or each blank such that the increase in volume thereof is unlimited with respect to said enclosure.

According to one example of embodiment of the invention, this expansion process consists in varying, discretely or continuously, said absolute pressure of said fluid between a maximum value less than or equal to 26 bar and a value less than said maximum value.

According to the invention, this expansion process consists in using a liquid fluid, such as water, or a gaseous fluid, such as hot air, steam or nitrogen, for curing said or each blank.

According to an optional characteristic of the invention, this expansion process consists of cooling said bath to a temperature less than or equal to 100° C. and to an absolute pressure of between 1 and 26 bar, following the curing of said or each blank.

According to another characteristic of the invention, this expansion process consists of curing a plurality of blanks of linear and/or curved forms in said bath.

It will be noted that the supports or parts of supports thus obtained may have forms and dimensions which are variable according to the desired applications.

The subject of the present invention is also a process for cross-linking and expanding at least one cross-linkable, expandable blank which is intended to form, in the cross-linked, expanded state, all or part of an elastomeric safety support of cellular structure having closed cells, said support being intended to be mounted on a wheel rim within a tire.

This cross-linking and expansion process according to the invention also makes it possible to overcome the aforementioned drawback in relation to cross-linked, expanded supports, which drawback results from the use of a mold for the cross-linking, and it is such that:

said cross-linking consists of curing said or each expandable or expanded blank in a bath of fluid at excess pressure which is contained in an enclosure, such that said or each blank interacts with said bath independently of said enclosure, the temperature of said bath having a maximum value of between 110° C. and 210° C., and the absolute pressure of said bath having at least a value equal to or greater than 14 bar, and in that said expansion consists of subjecting said or each cross-linkable or cross-linked blank to an expansion process according to the invention such as defined above.

It will be noted that in the present description "cross-linkable blank" is understood to mean a blank which can still be cross-linked, independently of prior heat treatments which may have caused the start of cross-linking. Consequently, a blank which has previously been subjected to heat treatment involving surface cross-linking is for example considered as being cross-linkable. This heat treatment may have consisted of preheating in an oven of an extruded blank and/or in the operation of forming a blank itself, in the event that it is injection or transfer molding, for example, which is being effected.

It will also be noted that this cross-linking and expansion process according to the invention makes it possible to be set free from the toric geometry of the blank which is conventionally imposed by using a mold, and that it also makes it possible to obtain cross-linked, expanded supports or parts of supports having complex geometries which would be difficult to demold under satisfactory conditions, such as for example, grooves and/or lobes and/or cutouts in any one of the directions of the support or the part of the support.

It will also be noted that this mold-less cross-linking/ expansion operation for cross-linking makes it possible to obtain supports or parts of supports which do not have a parting line, which does not weaken the corresponding support or part of the support.

According to one embodiment of the invention, this cross-linking and expansion process may consist:

in a first step, of subjecting said or each cross-linkable, expandable blank to said cross-linking in order to obtain a practically cross-linked, expandable blank, then in a second step, of subjecting said or each blank which is practically cross-linked and expandable which is obtained following said first stage to said expansion, in order to obtain all or part of said corresponding cross-linked, expanded safety support.

According to another embodiment of the invention, this cross-linking and expansion process may consist:

in a first step, of subjecting said or each cross-linkable, expandable blank to said expansion in order to obtain a cross-linkable, practically expanded blank, then in a second step, of subjecting said or each blank which is cross-linkable and practically expanded to said cross-linking, in order to obtain all or part of said corresponding cross-linked, expanded safety support.

Advantageously, the cross-linking and expansion process according to the invention consists of using one or more blanks each of which are based on a copolymer of isoprene and isobutylene (butyl rubber or IIR).

This elastomer has in particular reduced air permeability.

According to other examples of embodiment, there could also be used for the blank(s) the halogenated, in particular chlorinated or brominated, versions of this copolymer (BIIR, or CIIR rubbers, bromobutyl and chlorobutyl rubbers respectively), copolymers of dienes and of alpha-olefins, for example terpolymers of ethylene, propylene and a diene (EPDM), polychloroprene (CR), or also a blend of natural rubber (NR) and polybutadiene (BR) in substantially identical proportions.

According to one example of embodiment of the invention, a curing device according to the invention for implementing said cross-linking and expansion process of the type comprising an enclosure which is provided with at least one opening for the introduction and extraction of said or each blank, means for receiving said or each blank, means for filling said enclosure with liquid or gaseous fluid, and heating and pressurization means for the fluid contained within said enclosure, in which said enclosure comprises:

an introduction compartment provided at its inlet with an opening for introducing into said compartment a unit of cross-linkable, expandable blanks for the curing thereof, said introduction opening being provided with a means for shutting it off, a curing compartment provided downstream of said introduction compartment and provided at its inlet with a first mobile partition for allowing it to communicate with said introduction compartment, said curing compartment being intended to contain said heated, pressurised fluid in order to obtain a unit of cross-linked, expandable blanks, and an extraction compartment provided downstream of said curing compartment and provided at its inlet with a second mobile partition for allowing it to communicate with said curing compartment and at its outlet with an opening to atmospheric pressure for obtaining a unit of cross-linked, expanded blanks and their extraction from said enclosure, said extraction opening being provided with a means for shutting it off, means for alternately transferring said fluid at excess pressure from said extraction compartment towards said introduction compartment, and from said introduction compartment towards said extraction compartment.

It will be noted that these compartments make it possible to cross-link and expand units of blanks continuously, by including automated displacement of each unit within one and the same compartment and/or from one compartment to another, owing to the aforementioned openings and mobile partitions.

In fact, these partitions and openings, when in the closed position, make it possible to form locks at the location of the introduction and extraction compartments and, when said openings are in the closed position and said partitions are in the open position, enable one or the other of said introduction and extraction compartments (which is then filled with fluid) to form alternately a pressure balance with the adjoining curing compartment which is itself continuously filled with fluid.

It will also be noted that the total volume expansion of the blanks is obtained in said extraction compartment when the absolute pressure in this compartment is again made equal to atmospheric pressure (by means of said extraction opening, which is then in the open position, thus forming a pressure balance with the ambient air).

It will furthermore be noted that this cross-linking/expansion device according to the invention may be advantageously integrated in an overall process for manufacturing supports or sections of supports which is implemented continuously, that is to say, directly downstream of the forming stations, for example by extrusion or by injection, and for preheating the shaped blanks in an oven.

A curing device according to the invention may comprise any automated means suitable for controlling and checking parameters of the expansion/cross-linking process, such as temperature, pressure and the flow rate of curing water.

According to another example of embodiment of the invention, a curing device for implementing said cross-linking and expansion process, which is of the type comprising an enclosure which is provided with means for the introduction and extraction of said or each blank, means for receiving said or each blank, means for filling said enclosure with liquid or gaseous fluid, and heating and pressurization means for the fluid contained within said enclosure, is such that said enclosure is provided with a plurality of receiving means respectively provided to receive a plurality of blanks, said receiving means being mounted adjacent to each other on a conduit intended for filling said enclosure with fluid and extending into the interior thereof.

According to another characteristic of this example of embodiment, said enclosure comprises an outlet conduit connected to means for circulating said fluid towards said means for filling the enclosure.

According to another example of embodiment of the invention, a curing device for implementing said cross-linking and expansion process, of the type comprising an enclosure which is provided with at least one opening for the introduction and extraction of said or each blank, means for receiving said or each blank, means for filling said enclosure with liquid or gaseous fluid, and heating and pressurization means for the fluid contained within said enclosure, is such that:

said means for filling the enclosure are formed of a conduit opening into an opening in said enclosure, said enclosure being provided with a means which slides hermetically on the inner face of its wall for pressurising the fluid contained within said enclosure, this enclosure also being suitable for permitting emptying of said enclosure, and that said means for heating said fluid are mounted around said enclosure and said conduit.

It will be noted that, in this example of embodiment, the sliding means for pressurising the interior of the enclosure may be of the piston type, and that said heating means may for example comprise a coil through which a heat-transfer fluid flows, or an electrical resistor.

As for the fluid which can be used in this example of embodiment, it is preferably formed of a liquid, the boiling point of this liquid being beyond the temperature used for the curing, which may vary from 110° C. to 210° C.

However, it is also possible to use a gas, provided that a gas is used, the relative weight of which relative to the air is suitable to permit the pressurization of said enclosure from said filling/emptying conduit.

A section of safety support according to the invention, or such a safety support also according to the invention, are obtained by the cross-linking/expansion process referred to above, said section being formed of a cross-linked, expanded rubber composition having a cellular structure having closed cells.

Advantageously, these cross-linked, expanded sections or supports according to the invention may each comprise, radially towards the inside of their outer surface, an intermediate layer, the thickness of which is between 5% and 30% of the smallest dimension of a cross-section through said section or said support, and the density of which is less than that of the core of said section or said support.

It will be noted that this density gradient could not be obtained by the aforementioned conventional processes, that is to say with cross-linking in a mold followed by expansion to atmospheric pressure.

This intermediate layer of low density makes it possible to minimize the internal heating of the support when travelling at zero pressure.

According to another characteristic of the invention, the cross-linked, expanded sections or supports obtained each have a maximum density in a surface layer at the location of their outer surfaces, radially to the outside of said intermediate layer.

It will be noted that this surface layer, which has a high density close to that of the corresponding non-expanded blank, imparts to the support or to the section of support a surface resistance which is suited, firstly, to direct mounting on the rim and, secondly, to the repeated contacts with the reliefs of the inner face of a tire.

According to another characteristic of the invention, the cross-linked, expanded supports or sections obtained each have an average density of between 0.04 and 0.4 and, for example, substantially equal to 0.13.

It will be noted that an average density of close to 0.04 makes it possible to have a support characterized by satisfactory damping of shocks and by minimized internal heating. Such a support is particularly intended to be fitted on tires of the cross-country rally type for temporary use.

An average density close to 0.4 makes it possible to impart high structural rigidity to the corresponding support, which is particularly intended to be fitted on tires bearing heavy loads.

As for an average density close to 0.13, it makes it possible to impart to the core of the corresponding support sufficient rigidity, for example to minimize the deformations of the support during travel which are imposed by centrifugal force, when the tire is under inflation pressure and when the base of the support is connected to the rim, for example by means of a reinforcement or another means of connecting to the rim. Such a support is particularly intended to be fitted on tires of the automobile type.

According to another characteristic of the invention, the respective diameters of said cells vary on average from 0.1 mm to 2 mm, over a cross-section of said support or section.

Advantageously, said cross-linked, expanded section or support are each based on a copolymer of isoprene and isobutylene.

According to one example of embodiment of the invention, said cross-linked, expanded section or support each comprise, as reinforcing filler, a blend of 10 to 30 phr silica and 10 to 30 phr carbon black (phr: parts by weight per hundred parts of elastomer(s)).

The silica which may be used may be any reinforcing silica known to the person skilled in the art, in particular any precipitated or pyrogenic silica having a BET surface area and a CTAB specific surface area both of which are less than 450 m$^2$/g, even if the highly dispersible precipitated silicas are preferred.

In the present specification, the BET specific surface area is determined in known manner, in accordance with the method of Brunauer, Emmett and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made for example of the silica Ultrasil VN3 from Degussa, and the silicas Zeosil 1165 MP and 1115 MP from Rhodia.

Of course, "silica" is also understood to mean mixtures of different silicas, in particular of highly dispersible silicas such as described above.

Suitable carbon blacks are any carbon blacks, in particular the blacks of the type HAF, ISAF and SAF, which are conventionally used in tires, and particularly in tire treads. As non-limitative examples of such blacks, mention may be made of the blacks N115, N134, N234, N339, N347 and N375. The mass fraction of carbon black present in the reinforcing filler may vary within wide limits, this quantity preferably being from 40% to 60%, for a mass fraction of silica of from 60 to 40%.

According to one example of embodiment of the invention, the support or section of support, which comprises a base intended to be mounted on said wheel rim and a crown intended to bear on the tread of said tire following a drop in pressure within the latter, is such that it has at least one longitudinal groove extending over said crown substantially level with the latter, in the direction of the length of said support or section of support.

According to another example of embodiment of the invention, the support or section of support is such that it has at least one longitudinal cutout in its mass, which extends in the direction of the length of said support or section of support.

It will be noted that these two examples of profiles of supports or of sections of supports, which may be obtained using the cross-linking/expansion process according to the invention, cannot be obtained under satisfactory conditions by means of the conventional processes using a mold for cross-linking. In fact, these particular profiles make the demolding operation particularly difficult.

DESCRIPTION OF THE DRAWINGS

The aforementioned characteristics of the present invention, as well as others, will be better understood on reading the following description of several examples of embodiment of the invention, which are given by way of illustration and not of limitation, said description being given in relation to the appended drawing, in which.

DESCRIPTION OF PREFERRED EMBODIMENTS

Figure 1:
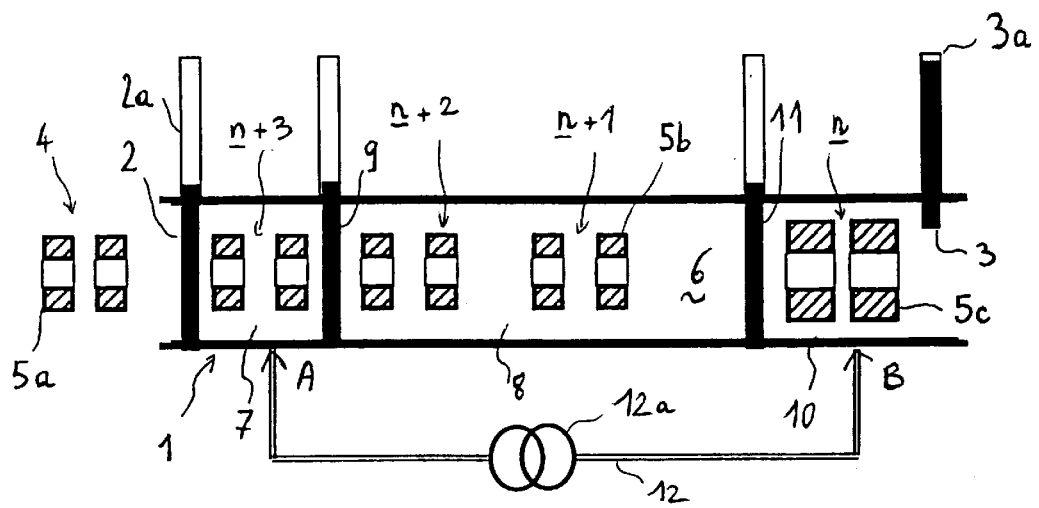
FIG. 1 is a diagram illustrating an example of a device for implementing the cross-linking/expansion process according to the invention.

A curing device in accordance with FIG. 1 comprises an enclosure 1 which is provided with at least one gate closable opening 2, 3 for the introduction and extraction of units 4 comprising a plurality of blanks 5a, 5b, means for receiving each blank, means for filling said enclosure 1 with liquid or gaseous fluid 6, and heating and pressurization means for the fluid 6 contained within said enclosure which are controlled by control means (these receiving, filling, heating/pressurization and control means are not shown for reasons of clarity).

The enclosure 1 of FIG. 1 comprises:

an introduction compartment 7 provided at its inlet with an opening 2 for introducing a unit 4 of cross-linkable, expandable blanks 5a, said introduction opening 2 being provided with a means 2a for permitting the freeing or blocking thereof (this opening 2 is shown in the blocked position in FIG. 1), a curing compartment 8 provided downstream of the previous one and provided at its inlet with a first mobile partition 9 for placing it in communication with said introduction compartment 7 (this partition 9 is shown in the hermetic partitioning position in FIG. 1). This curing compartment 8 is intended to contain said fluid 6 which is heated and under pressure in order to obtain at least one unit 4 of cross-linked, expandable blanks 5b (in the simply illustrative example of FIG. 1, the compartment 8 is intended to receive two units 4), an extraction compartment 10 provided downstream from the former, which is intended to receive one unit 4 of said cross-linked, expandable blanks 5b. This compartment 10 is provided at its inlet with a second mobile partition 11 for placing it in communication with said curing compartment 8 (this partition 11 is also shown in the hermetic partitioning position in FIG. 1), and at its outlet with an opening 3 for extracting from said enclosure 1 a unit 4 of cross-linked, expanded blanks 5c, said extraction opening 3 (shown in the open position in FIG. 1) being provided with a means 3a for freeing or blocking it, and means 12 for alternately transferring the fluid 6 at excess pressure from the extraction compartment 10 towards the introduction compartment 7, and vice versa (an element 12a for setting the fluid 6 in motion is shown in FIG. 1, for example a pump).

The cross-linking operation, which is carried out in the curing compartment 8, consists of curing each unit 4 of cross-linkable, expandable blanks 5a in a bath of fluid 6 at excess pressure, such that each blank interacts with said bath 6 independently of the compartment 8, the temperature of said bath 6 having a maximum value of between 110° C. and 210° C., and the absolute pressure of said bath 6 having at least a value equal to or greater than 14 bar.

As for the expansion operation, it is initiated in the curing compartment 8 during the cross-linking (the blowing agent present in each blank 5a decomposing, which initiates the germination of the cells), but the expansion (in the conventional sense of increase in volume, which is attributed to this term in the present description) effectively taking place only in the extraction compartment 10, when the latter is devoid of the fluid 6 and is brought to atmospheric pressure.

More precisely, the temperature of said bath 6 in the curing compartment 8 has a maximum value of between 110° C. and 210° C., and the absolute pressure of said bath 6 has at least a value equal to or greater than 5 bar.

Still in accordance with the invention, the expansion of each cross-linked blank 5b, which takes place at a final pressure-relief value of the absolute pressure at 1 bar, is effected such that the increase in volume of each blank 5b is unlimited with respect to the extraction compartment 10, to produce the corresponding cross-linked, expanded support or part of the support 5c.

This device can operate continuously, advantageously directly downstream from the forming stations for the blanks (for example consisting of extruders) and the stations for preheating the formed blanks in an oven, by reproducing over time the following cycle of operations.

There is extracted from the extraction compartment 10 a unit of cross-linked, expanded supports or parts of supports 5c of rank n then the partition 11 is moved into the de-partitioning position in order to fill this compartment 10, the opening 3 of which has been blocked, with fluid 6, so as to be able to displace each unit 4 contained in the enclosure 1 by one rank. The unit of rank n+1 of cross-linked, expandable blanks 5b is thus in said compartment 10, for the expansion thereof.

There is introduced in parallel a unit 4 of higher rank (n+3 in the example of FIG. 1) into the introduction compartment 7, which has previously been open to atmospheric pressure, then the opening 3 of the compartment 10 is blocked in order to transfer the fluid 6 contained in the extraction compartment 10 to the compartment 7, as is indicated by the arrow A of FIG. 1 (the partition 11 of the compartment 10 having first been moved into the closed position).

Then the opening 3 of the compartment 10 is opened to permit expansion of the blanks 5b of the unit 4 of rank n+1, owing to the equilibrium at atmospheric pressure, then the cross-linked, expanded blanks 5c of this unit are extracted.

In parallel, the units 4 are displaced within the enclosure 1 by one rank, as indicated previously, the pressure equalization between the compartments 7 and 8, on one hand, and 8 and 10, on the other hand, making this displacement possible (the arrow B in FIG. 1 illustrates the transfer of the fluid 6 from the compartment 7 to the compartment 10), and so on.

Figures 2, 3:
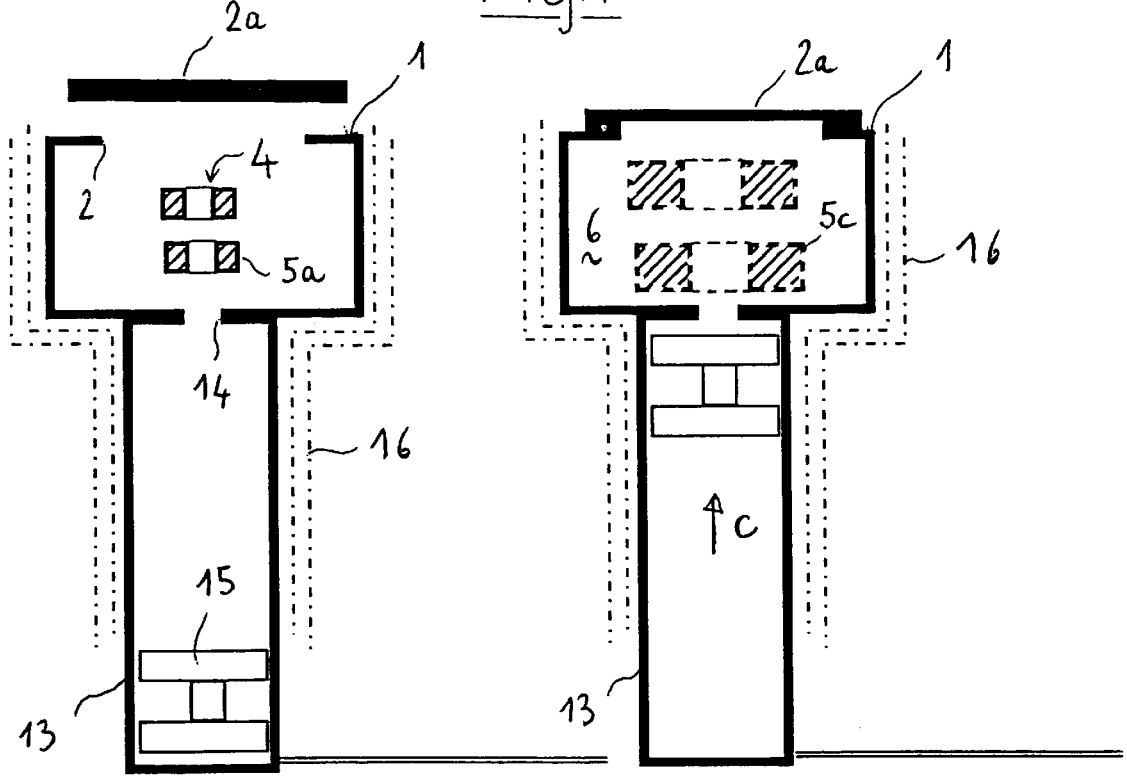
FIGS. 2 and 3 are diagrammatic sectional views illustrating another embodiment of a curing device for implementing the cross-linking/expansion process according to the invention in two operating positions.

There is shown in FIGS. 2 and 3 another example of embodiment of a curing device according to the invention for the cross-linking/expansion of a unit 4 of blanks 5a.

This curing device comprises an opening 2 for the introduction of a unit 4 of cross-linkable, expandable blanks 5a (see FIG. 2) and for the extraction of the corresponding unit 4 of the cross-linked, expanded supports or parts of supports 5c, which are shown in broken lines in FIG. 3 (at the end of the expansion operation). This device also comprises means for filling the enclosure 1 which are provided by a conduit 13 which communicates through an opening 14 with said enclosure 1.

The conduit 13 is provided with a means 15 which slides hermetically on the inner face of its wall to pressurise the fluid 6 contained within said enclosure 1 (see arrow C in FIG. 3, in which the opening 2 has been closed in order to fill the enclosure 1 with the fluid 6). This means 15 is for example of the piston type.

The fluid 6 which can be used in this embodiment is preferably formed of a liquid, the boiling point of this liquid being above the temperature used for the cross-linking/expansion, which may vary from 110° to 210° C.

Furthermore, the conduit 13 is also suitable to permit emptying of said enclosure 1.

This curing device also comprises means 16 for heating the fluid 6 which are mounted around said enclosure 1 and said conduit 13. These heating means 16 may be formed of a coil through which a heat-transfer fluid flows, or an electrical resistor.

Of course, the curing device of FIGS. 2 and 3 comprises means for receiving the blanks 5a in the enclosure 1, and also means for controlling the pressure and temperature parameters.

Figure 4:
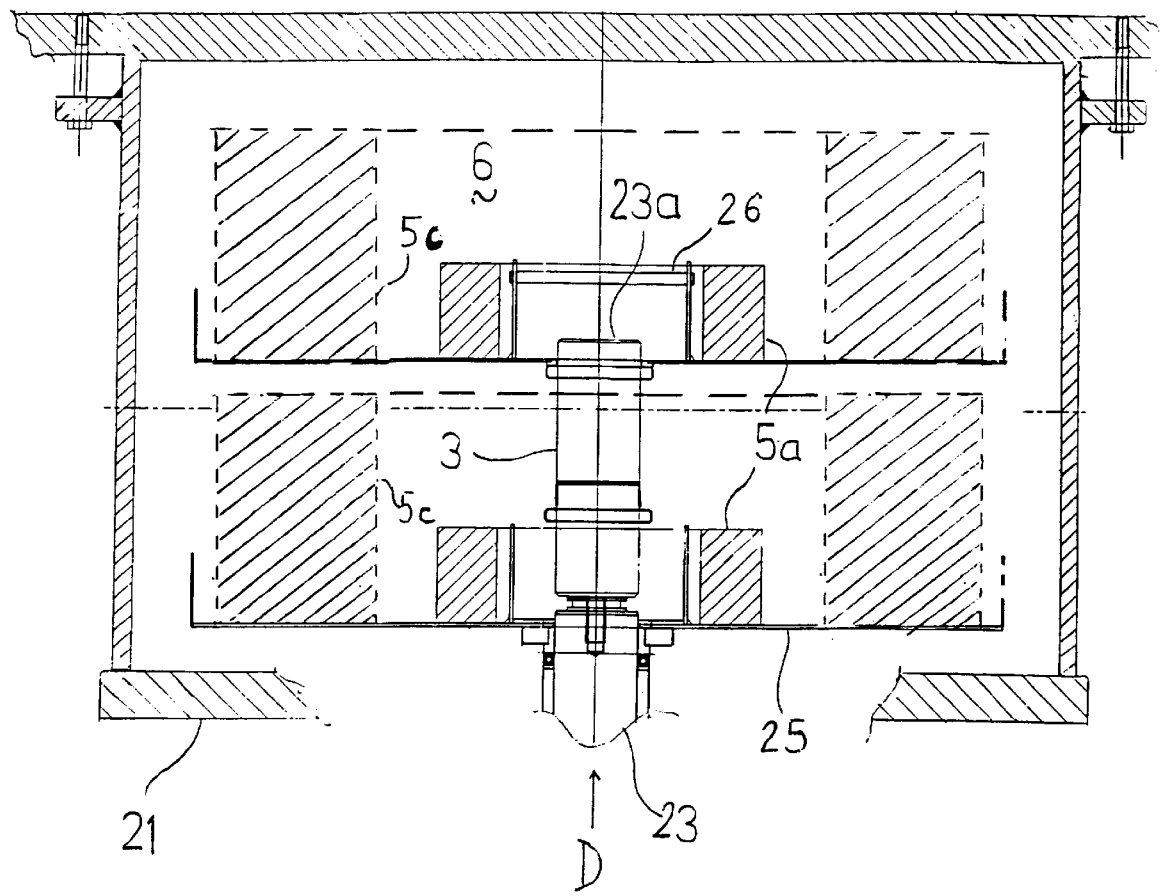
FIG. 4 is a diagrammatic view in partial section of another embodiment of a curing device according to the invention for implementing this process.

Another example of a curing device according to the invention is shown in FIG. 4.

This device is essentially formed of an enclosure 21 which is provided with a fluid inlet conduit 23 (see arrow D) which opens onto the inside of the enclosure 21 via its end 23a, said conduit 23 being connected to a heating and pressurization circuit for the bath 6 of fluid contained in the enclosure 21, and of a fluid outlet conduit separate from said inlet conduit 23 (this heating/pressurization circuit and said outlet conduit are not shown).

Of course, this device also comprises means for introducing cross-linkable, expandable blanks 5a into the enclosure 21, and for extracting the corresponding cross-linked, expanded supports or parts of supports 5c.

In the example of embodiment of FIG. 4, the inlet conduit 23 is suitable for supporting, at regular height intervals, plates 25 which are each intended to receive a blank 5a, for the cross-linking/expansion thereof.

There are shown in FIG. 4 blanks 5a of overall toric form, but it will be noted that each plate 25 could receive blanks 5a of any shape, for example linear, in order to obtain linear sections of supports instead of toric supports.

Each plate 25 is provided with means 26 for centering the corresponding blank 5a when it is put in position. In the example of FIG. 4, these means 26 are formed of a positioning block around which the blank 5a is intended to be positioned.

Each of the two examples of a device according to the invention which have been described above, on one hand, in relation to FIGS. 2 and 3 and, on the other hand, in relation to FIG. 4, operate as follows.

In the manner of what has been described in relation to FIG. 1, the cross-linking operation consists of curing the cross-linkable, expandable blanks 5a in the bath 6 of fluid at excess pressure, such that each blank interacts with said bath 6 independently of the walls of the enclosure 1, 21. More precisely, the temperature of the bath 6 has a maximum value of between 110° C. and 210° C., and its absolute pressure comprises at least a value equal to or greater than 14 bar.

As for the expansion operation, it is initiated in said bath 6 provided that the temperature thereof comprises a maximum value of between 110° C. and 210° C., and that its absolute pressure has at least a value equal to or greater than 5 bar, and the increase in volume of the blank 5a, which is a result of the expansion, takes place actually once the latter is at atmospheric pressure by opening the enclosure 1, 21 (see the supports 5c in broken lines in FIGS. 3 and 4).

As has been indicated in relation to FIG. 1, it will be noted that this expansion is unlimited with respect to the walls of the enclosure 1, 21.

As far as the curing device of FIG. 4 is concerned, it will be noted that curing in the bath 6 may be advantageously effected with a continuous flow of fluid, owing to the permanent circulation of the fluid from said outlet conduit to said inlet conduit 23.

First Series of Tests for Cross-linking/Expansion

A plurality of tests were carried out, using for the blanks two cross-linkable, expandable rubber compositions which are both based on butyl rubber but which differ essentially from one another in that a first composition A comprises a reinforcing filler formed of carbon black, whereas a second composition B comprises a reinforcing filler made of a blend of carbon black and silica.

Table I hereafter sets forth these essential differences.

TABLE I (phr: parts by weight per hundred parts of elastomer).

| Constituents introduced into the mixer | Composition A (amount in phr) | Composition B (amount in phr) |
|---|---|---|
| Carbon black N683 | 40 | 20 |
| Silica "Zeosil 1165 MP" | — | 20 |
| Blowing agent: (azobisformamide) | 13 | 13 |

Each blank was prior to this preheated by means of hot air in an electric oven without pressure, for a period of 70 minutes and at a temperature of 90° C.

The cross-linking/expansion operation was carried out using water as curing fluid.

A device was used such as that described in relation to FIG. 4, such that the water circulation rate from said outlet conduit to said inlet conduit 23 was maintained at 15 liters of water per minute.

In Table II below there are shown the specific operating conditions which are relative to each test performed, before the final pressure-relief of the inner space of the enclosure 21 to atmospheric pressure to effect the expansion of the cross-linked blanks.

With reference to an operating stage of predetermined duration (in minutes), there are indicated the corresponding values of relative pressure in the enclosure 21 (in bar) and of temperature (in ° C.). The same applies to the final cooling step.

As far as the emptying of the enclosure 21 is concerned, which makes it possible to make the pressure within the latter pass from an excess pressure value to the final pressure-relief value in order to effect the expansion of the cross-linked blanks (atmospheric pressure), the rate of emptying is controlled such that the change from said ultimate excess pressure value to atmospheric pressure is effected in a sufficiently long time, which in the tests performed is at least 30 seconds.

TABLE II

| Test | Cross-linkable, expandable composition | blank length (mm) | first stage (bar, min., ° C.) | second stage (bar, min., ° C.) | cooling (bar, min., ° C.) |
|---|---|---|---|---|---|
| No. 1 | A | 412 | 12-90-142 | — | 12-20-20 |
| No. 2 | A | 355 | 23-90-142 | — | 23-20-20 |
| No. 3 | A | 275 | 23-50-142 | — | 23-10-20 |
| No. 4 | A | 275 | 16-90-142 | — | 16-20-20 |
| No. 5 | A | 275 | 23-60-142 | 9-40-142 | 9-20-20 |
| No. 6 | A | 275 | 16-90-142 | 9-40-142 | 9-20-20 |
| No. 7 | A | 275 | 23-60-142 | 12-40-142 | 9-20-20 |
| No. 8 | B | 275 | 23-60-142 | 9-40-142 | 9-20-20 |

The supports obtained by means of these tests were analysed. Table III hereafter summarises the dimensional and cellular characteristics of the supports obtained.

Figure 5:
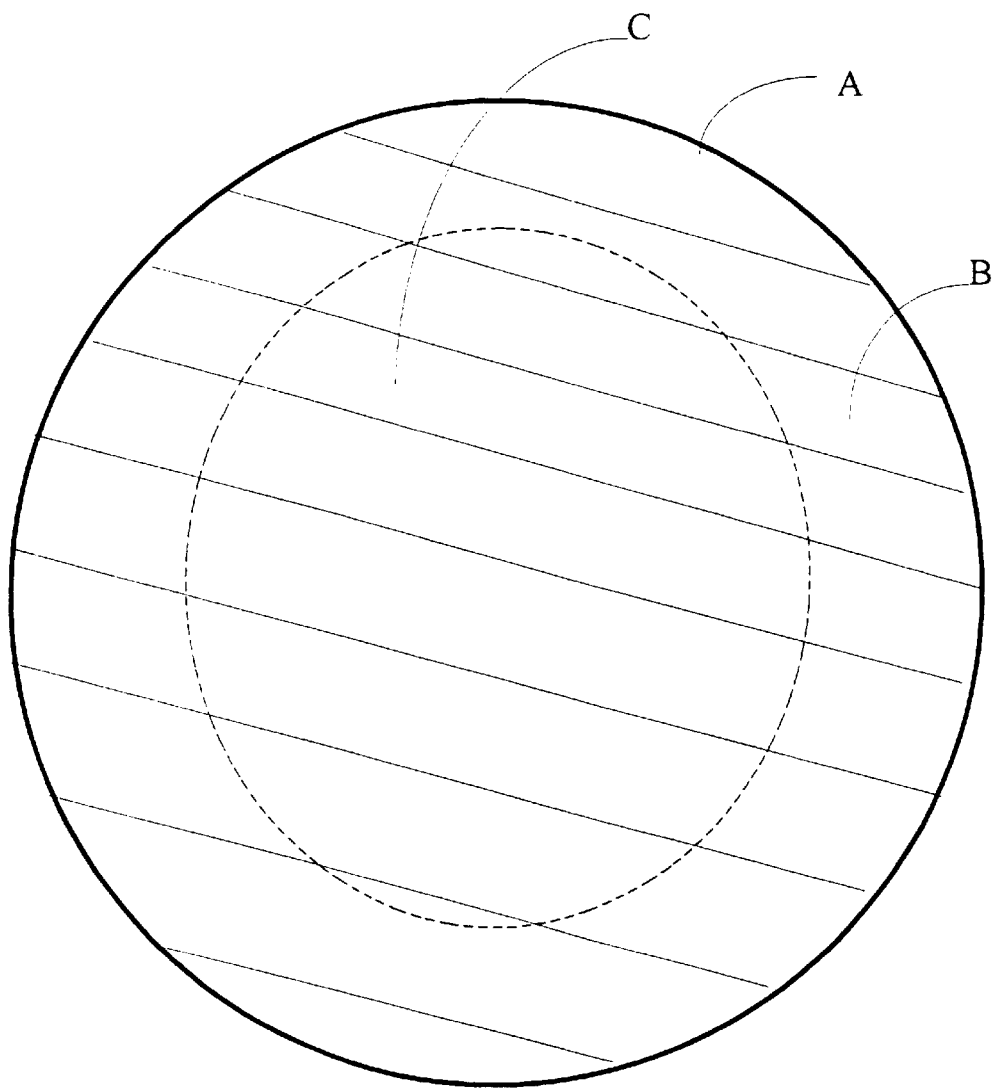
FIG. 5 is a diagrammatic sectional view through a support obtained by the cross-linking/expansion process according to the invention.

Each of these cross-linked, expanded supports is characterized, on one hand, by an intermediate layer B of a thickness of several mm radially towards the inside of its outer surface and, on the other hand, by a surface layer A at the location of said external surface (see FIG. 5).

As far as the measurement of the size of cells in the central layer C of each support is concerned, the sizes at the core and at mid-thickness were distinguished.

As far as the measurement of the size of cells in the intermediate layer B is concerned (last column of Table III), these are measurements of maximum sizes at 5 mm from the outer surface (surface layer A) of each support.

TABLE III

| Cross-linked, expanded supports | width (mm) | height (mm) | maximum diameters of the cells at the core (mm) | maximum diameters of the cells at mid-thickness (mm) | maximum diameters of the cells in the layer B (mm) |
|---|---|---|---|---|---|
| No. 1 (2 supports produced) | 115 165 | 63 110 | not measured | not measured | not measured |
| No. 2 | 182 | 123.5 | 0.2 | 0.2 | 0.3–0.5 |
| No. 3 | 105 | 50 | not measured | not measured | not measured |
| No. 4 | 190 | 130 | 0.3 | 0.3 | 0.5 |
| No. 5 | 193 | 106 | 0.5 | 0.5 | 0.5 |
| No. 6 | 197 | 111 | 1 | 1 | 0.7 |
| No. 7 | 192 | 121 | 0.3 | 0.3 | 0.4 |
| No. 8 | 208 | 118 | 1.8 | 1.3 | 0.7 |

The support obtained by test No. 1 has insufficient cross-linking, owing to the insufficient value of the pressure which is used, which value is not in accordance with the invention (12 bars relative pressure).

The support obtained by test No. 2, which corresponds to the use of a relative pressure of 23 bar in the enclosure (maximum value used for all the tests), has a cell size in accordance with the invention (since it is between 0.1 and 2 mm).

The support obtained by test No. 3 has insufficient cross-linking and expansion, owing to too short a dwell time in the curing bath, this insufficient expansion resulting from the premature stopping of the decomposition reaction of the blowing agent.

It will be understood that an increase in the dwell time of the blank in the curing bath would have made it possible, in particular, to impart increased expansion to a support, such as the one obtained in test No. 3, for example.

The support obtained by test No. 4 (using a single stage at the relative pressure of 16 bar) has satisfactory cross-linking and expansion, and also a cell size in accordance with the invention.

The support obtained by test No. 5 (using two stages, the relative pressure values of which are 23 bar and 9 bar respectively) also has satisfactory cross-linking and expansion.

The support obtained by test No. 6 (using two stages, the relative pressure values of which are 16 bar and 9 bar respectively) has increased expansion compared with that of the preceding support (test No. 5), as shown by the cell size, which has substantially doubled.

The support obtained by test No. 7 (using two stages, the relative pressure values of which are 23 bar and 12 bar respectively) also has satisfactory cross-linking and expansion characteristics.

As for the support obtained by test No. 8, which support comprises a blend of carbon black and silica as reinforcing filler, it also has satisfactory cross-linking and expansion. Furthermore, this expansion is very high in the core of the support.

It will be noted that each of the supports obtained by the process according to the invention is characterized by cell diameters which are relatively close to each other, from the core to the surface of the supports. Furthermore, it was confirmed that the intermediate layer B of each support according to the invention was of a thickness less than that of the known supports obtained by conventional processes, and that this layer B had an overall lower density than that of the corresponding layer B of such a known support.

It will also be noted that the average cell size over a cross-section of the support is highest when the relative pressures of the first and second stages are respectively 16 bar and 9 bar (test No. 6), whereas on the other hand it is lowest when a single stage of relative pressure of 23 bar is used (test No. 2).

Second Series of Tests for Cross-linking/Expansion

A plurality of tests according to the invention were carried out, using for the blanks 4 rubber compositions comprising said compositions A and B and two other cross-linkable, expandable compositions C and D, which are all based on butyl rubber.

Table IV hereafter gives the respective formulations of these compositions C and D.

TABLE IV

| (phr: parts by weight per hundred parts of elastomer). | | |
|---|---|---|
| Constituents introduced into the mixer | Composition C (amount in phr) | Composition D (amount in phr) |
| Carbon black N683 | 40 | 40 |
| Silica "Zeosil 1165 MP" | — | — |
| Blowing agent(azobisformamide) | 12 | 11 |

Each blank was prior to this preheated by means of hot air in a ventilated oven, for a period of 70 minutes and at a temperature of about 100° C.

The cross-linking/expansion operation, as previously, is effected by means of a continuous flow of water, by means of a device such as that of FIG. 4, such that the circulation and emptying rates (for the cross-linking and the expansion, respectively) are maintained at 15 liters of water per minute.

In Table V below there are shown the specific operating conditions which relate to each test performed, before effecting the final pressure-relief of the inner space of the enclosure 21 to atmospheric pressure to effect the expansion of the cross-linked blanks.

With reference to an operating stage of predetermined duration (in minutes), there are indicated the corresponding values of pressure (in bar) and of temperature (in ° C.). The same applies to the final cooling step.

TABLE V

| Test | Cross-linkable, expandable comp. | blank perimeter (mm) | blank weight (g) | first stage (bar, min., ° C.) | second stage (bar, min., ° C.) | cooling (bar, min., ° C.) |
|---|---|---|---|---|---|---|
| No. 9 | A | 871 | 2785 | 23-95-142 | | 23-15-20 |
| No. 10 | A | 868 | 2738 | 23-55-146 | | |
| No. 11 | A | 859 | 2755 | 23-60-142 | 12-50-142 | 12-20-20 |
| No. 12 | A | 870 | 2782 | 23-60-142 | 9-40-142 | 9-20-20 |
| No. 13 | A | 856 | 2748 | 16-60-142 | 9-50-142 | 9-20-20 |
| No. 14 | A | 872 | 2778 | 16-60-142 | 12-40-142 | 12-20-20 |
| No. 15 | A | 867 | 2768 | 23-60-142 | 9-40-142 | 9-20-20 |
| No. 16 | A | 873 | 2768 | 23-60-142 | 9-40-142 | 9-20-20 |
| No. 17 | A | 869 | 2728 | 16-60-142 | 12-50-142 | |
| No. 18 | A | 856 | 2754 | 23-30-142 | 12-40-142 | 12-20-20 |
| No. 19 | A | 866 | 2763 | 23-60-142 | 9-40-142 | 9-20-20 |
| No. 20 | A | 868 | 2768 | 23-60-142 | 9-40-142 | 9-20-20 |
| No. 21 | A | 869 | 2772 | 23-60-142 | 9-40-142 | 9-20-20 |
| No. 22 | A | 867 | 2784 | 23-30-142 | 12-80-142 | 12-20-20 |
| No. 23 | D | 876 | 2765 | 23-60-142 | 9-40-142 | 9-20-20 |
| No. 24 | C | 976 | 1140 | 23-30-146 | 9-30-146 | 9-10-20 |
| No. 25 | C | 982 | 1144 | 23-30-146 | 9-40-146 | 9-20-20 |
| No. 26 | B | 814 | 2726 | 23-60-142 | 9-60-142 | 9-20-20 |
| No. 27 | B | 848 | 2746 | 23-60-142 | 9-50-142 | 9-20-20 |
| No. 28 | B | 865 | 2738 | 23-60-142 | 9-60-142 | 9-20-20 |

The supports obtained by means of these tests were analyzed. Table VI hereafter summarises the dimensional and cellular characteristics of these supports.

The volumes of the cross-linked, expanded supports obtained were determined using a form factor of 0.8 (actual cross-section of the support/rectangular section in which this actual cross-section is circumscribed).

TABLE VI

| Cross-linked, expanded supports | weight of support (g) | outer perimeter (mm) | inner perimeter (mm) | width (mm) | Volume (liters) | Average density |
|---|---|---|---|---|---|---|
| No. 9 | 2755 | 1907 | 1110 | 170 | 26.489 | 0.104 |
| No. 10 | 2708 | — | — | — | — | — |
| No. 11 | 2725 | 2007 | 1275 | 178 | 28.362 | 0.096 |
| No. 12 | 2752 | 2018 | 1300 | 178 | 28.212 | 0.098 |
| No. 13 | 2718 | 1987 | 1230 | 175 | 28.024 | 0.097 |
| No. 14 | 2748 | 1978 | 1190 | 163 | 26.211 | 0.105 |
| No. 15 | 2738 | 2002 | 1295 | 181 | 28.212 | 0.097 |
| No. 16 | 2738 | 2028 | 1320 | 185 | 29.414 | 0.093 |
| No. 17 | 2698 | 2050 | 1225 | 177 | 31.024 | 0.087 |
| No. 18 | 2724 | 1975 | 1236 | 183 | 28.885 | 0.094 |
| No. 19 | 2733 | 2022 | 1300 | 180 | 28.749 | 0.095 |
| No. 20 | 2738 | 2060 | 1345 | 182 | 29.602 | 0.092 |
| No. 21 | 2742 | 2048 | 1330 | 184 | 28.846 | 0.092 |
| No. 22 | 2754 | 1975 | 1203 | 173 | 27.757 | 0.099 |
| No. 23 | 2735 | 1800 | 1200 | 171 | 20.905 | 0.131 |
| No. 24 | 1110 | 2005 | 1455 | 87.5 | 10.085 | 0.110 |
| No. 25 | 1114 | 2033 | 1474 | 89 | 10.574 | 0.105 |
| No. 26 | 2696 | 1850 | 1020 | 170 | 26.034 | 0.104 |
| No. 27 | 2716 | 1900 | 1200 | 173 | 24.964 | 0.109 |
| No. 28 | 2708 | 1942 | 1185 | 160 | 24.500 | 0.111 |

It will be noted that the average density of a cross-linked, expanded support according to the invention may vary to a great extent between 0.04 and 0.4, average densities close to 0.04 or 0.4 possibly being obtained respectively in a manner known to the person skilled in the art by increasing or reducing the amount of blowing agent in the corresponding rubber composition.

It will also be noted that the average density close to 0.13 which was obtained, for example, by test No. 23 makes it possible to impart to the core of the corresponding support a rigidity which is suitable for minimizing its deformation during travel owing to centrifugal force.

The results of volume of the support which are mentioned in this Table VI show that supports Nos. 11 to 28 have satisfactory cross-linking and expansion, this expansion being promoted by the second stage of pressure at 9 or 12 bar (following a first stage at 23 or 16 bar which permits cross-linking).

It was also possible to confirm that each support according to the invention is characterized by cell diameters which are very close to each other, from the core to the surface of the supports.

Furthermore, it was confirmed that the intermediate layer B of each support according to the invention has a thickness of less than 5 mm, contrary to those of conventional supports, which are generally between 8 and 25 mm (for supports of width and height close to 200 mm and 120 mm, respectively), which makes it possible to minimize the propagation in the core of the support of the deformations due to the shearing stresses and, consequently, the internal heating of the latter when travelling at zero pressure.

Figure 6:
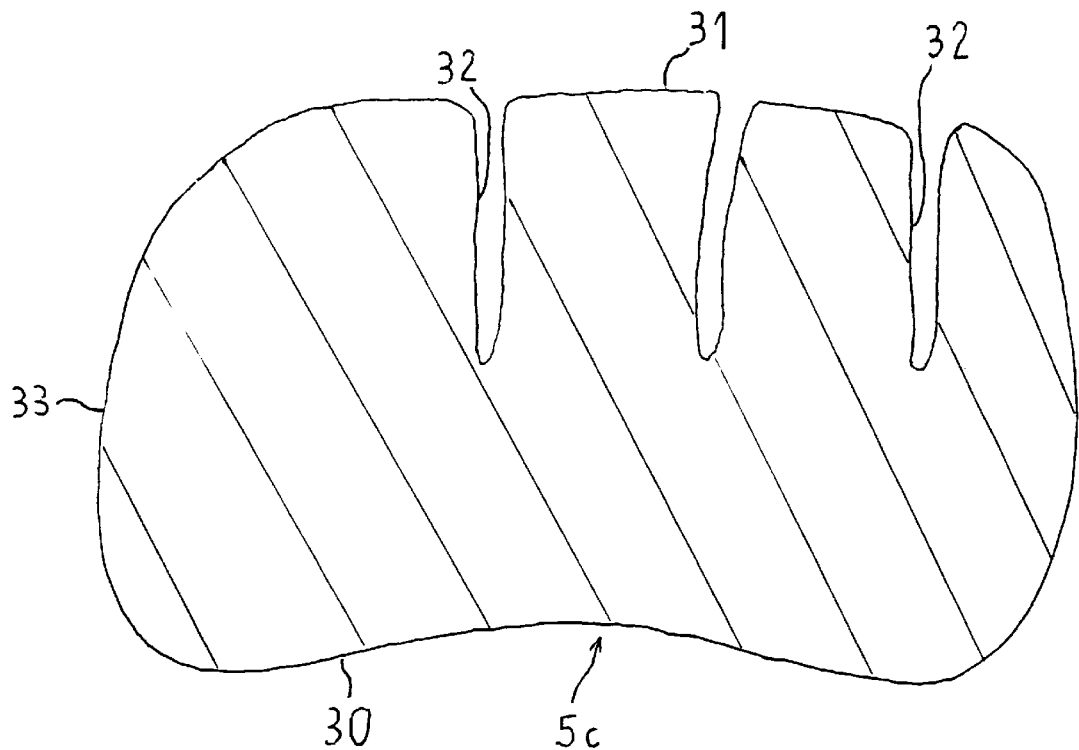
FIGS. 6 and 7 show two embodiments of profiles of supports according to the invention.
Figure 7:
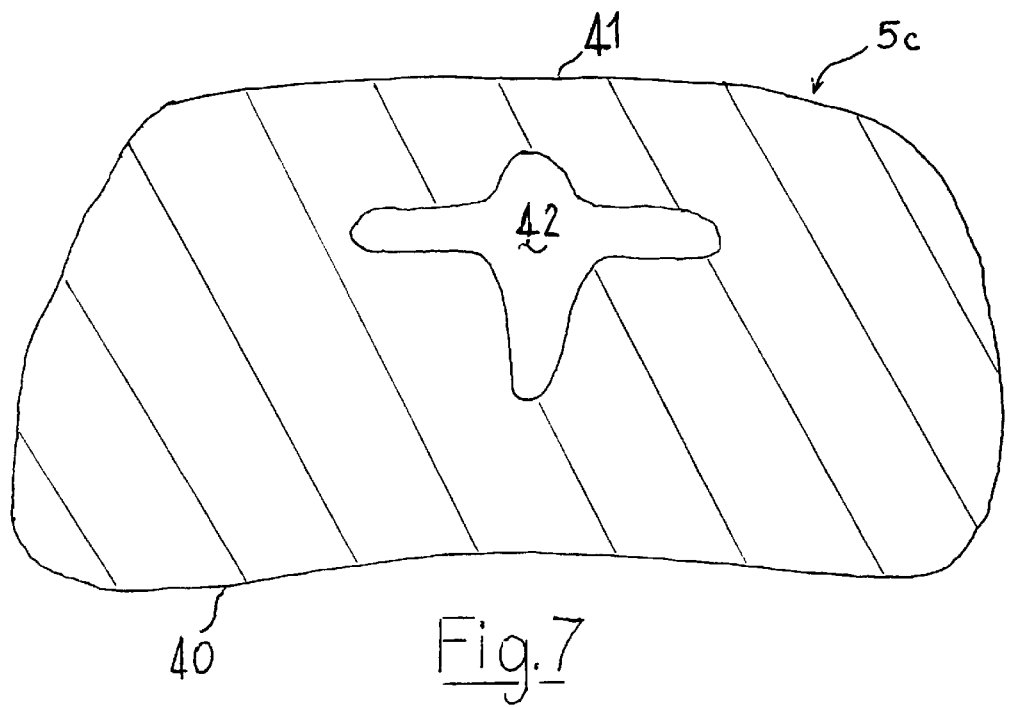

There are shown in FIGS. 6 and 7 two examples of embodiment of profiles of cross-linked, expanded supports which can be obtained by the cross-linking/expansion process according to the invention, that is to say, by a process making it possible to dispense with a mold for the cross-linking.

According to the embodiment of FIG. 6, the support 5c obtained comprises a base 30 which is intended to be mounted on a wheel rim either directly, or by means of a reinforcement or another connecting agent, and a crown 31 which is intended to bear on a tread of a tire, following a drop in pressure within the latter.

This support 5c has in this example a plurality of longitudinal grooves 32 extending over the crown 31, substantially level with the latter and in the direction of the length of the support 5c.

It will be noted that the process according to the invention also makes it possible to obtain profiles of supports 5c which have, in addition to said single grooves 32, other longitudinal grooves (not shown) in at least one of the other two directions of the support 5c (for example grooves on the face 33 of the support connecting the base 30 and the crown 31 together).

According to the embodiment of FIG. 7, the support 5c obtained has between its base 40 and its crown 41 a longitudinal cutout 42 in its mass, which extends in the direction of its length.

It will be noted that these two examples of profiles of supports could not be obtained under satisfactory conditions by means of the conventional processes using a mold for cross-linking, because their respective geometries do not permit demolding under satisfactory conditions, that is to say, without weakening the demolded support.

We claim:

1. A process for expanding at least one partially cross-linked blank which is intended to form, in the cross-linked, expanded state, all or part of an elastomeric safety support of cellular structure having closed cells and reduced air permeability, said support being intended to be mounted on a wheel rim within a tire, comprising:

curing said or each blank in a bath of liquid fluid at excess pressure which is contained in an enclosure, the temperature of said bath having a maximum value of between 110°C. and 210°C., said bath having an absolute pressure at least a value equal to or greater than 5 bar and a final pressure-relief value substantially equal to 1 bar, wherein said or each blank is capable of unlimited increases in volume with respect to said enclosure, wherein said elastomeric safety support comprises an intermediate layer located radially towards an inside of an outer surface of the elastomeric safety support, and a core having a density greater than the density of the intermediate layer, wherein said elastomeric safety support has a cross-section through said support and said intermediate layer has a thickness, wherein the cross-section has a smallest dimension, wherein said thickness is between 5% and 30% of the smallest dimension of a cross-section through said support or part thereof.

2. The process according to claim 1, wherein said bath is cured in a plurality of blanks having a curved form, to form elastomeric safety supports suitable for mounting on a wheel rim within a tire.

3. The process according to claim 2, wherein the curved form is a toric form.

4. The process according to claim 1 or 2, wherein the elastomeric safety support or part thereof has an average density of between 0.04 and 0.4.

5. The process according to claim 1 or 2, wherein said absolute pressure of said fluid is varied between a maximum value less than or equal to 26 bar and a value less than said maximum value.

6. The process according to claim 1 or 2, including cooling said bath to a temperature less than or equal to 100°C. and at an absolute pressure of between 1 and 26 bar, following the curing of said or each blank.

7. The process according to claim 1 or 2, wherein the elastomeric safety support or part thereof has an average cell diameter ranging from 0.1 mm to 2 mm.

8. A process for cross-linking and expanding at least one cross-likable, expandable blank which is intended to form in the cross-linked, expanded state, all or part of an elastomeric safety support of cellular structure having closed cells, said support being intended to be mounted on a wheel rim within a tire, comprising:

in a first step, subjecting said or each cross-likable, expandable blank to a cross-linking in order to obtain a practically cross-linked, expandable blank, including curing this blank in a bath of liquid fluid at excess pressure which is contained in an enclosure, such that said or each blank interacts with said bath independently of said enclosure, the temperature of said bath having a maximum value of between 110° C. and 210° C., and the absolute pressure of said bath having at least a value equal to or greater than 14 bar, then in a second step, expanding said or each practically cross-linked expandable blank, including curing said or each blank in a bath of liquid fluid at excess pressure which is contained in an enclosure, the temperature of said bath having a maximum value of between 110° C. and 210° C., said bath having an absolute pressure at least a value equal to or greater than 5 bar and a final pressure-relief value substantially equal to 1 bar, wherein said or each blank is capable of unlimited increases in volume with respect to said enclosure.

* * * * *